United States Patent
Yazici et al.

(10) Patent No.: US 12,553,392 B2
(45) Date of Patent: Feb. 17, 2026

(54) GAS TURBINE ENGINE WITH THERMAL MANAGEMENT

(71) Applicant: RTX Corporation, Farmington, CT (US)

(72) Inventors: Murat Yazici, Glastonbury, CT (US); Andrew E. Breault, Bolton, CT (US); Jeffrey T. Morton, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/747,077

(22) Filed: Jun. 18, 2024

(65) Prior Publication Data

US 2025/0382923 A1 Dec. 18, 2025

(51) Int. Cl.
  *F02C 9/18* (2006.01)
  *F02C 7/057* (2006.01)
  *F02C 7/14* (2006.01)

(52) U.S. Cl.
  CPC .............. *F02C 9/18* (2013.01); *F02C 7/057* (2013.01); *F02C 7/14* (2013.01); *F05D 2260/213* (2013.01); *F05D 2260/606* (2013.01)

(58) Field of Classification Search
  CPC .... F02C 6/08; F02C 7/04; F02C 7/042; F02C 7/057; F02C 9/18; F02K 3/077
  See application file for complete search history.

(56) References Cited

U.S. PATENT DOCUMENTS

| 5,438,823 | A | 8/1995 | Loxley |
| 9,267,434 | B2 | 2/2016 | Campbell |
| 10,494,949 | B2 | 12/2019 | Rambo |
| 10,927,761 | B2 | 2/2021 | Rambo |
| 11,078,837 | B2 | 8/2021 | Zysman |
| 2013/0098059 | A1 | 4/2013 | Suciu |
| 2013/0247587 | A1 | 9/2013 | Lo |
| 2015/0247462 | A1* | 9/2015 | Suciu ........................ F02C 7/18 |
| | | | 415/144 |
| 2022/0235707 | A1* | 7/2022 | Millhaem ................. F02C 6/08 |

OTHER PUBLICATIONS

EP search report for EP25183857.9 dated Nov. 20, 2025.

* cited by examiner

*Primary Examiner* — Scott J Walthour
(74) *Attorney, Agent, or Firm* — Getz Balich LLC

(57) ABSTRACT

A fluid thermal control system for a gas turbine engine is provided. The gas turbine engine has a compressor section and an engine fluid source that produces a flow of engine fluid. The fluid thermal control system includes an airflow inlet, an airflow outlet, a heat exchanger, an airflow inlet valve, and a bleed air valve. The heat exchanger permits heat transfer between a heat exchanger airflow and the flow of engine fluid. The airflow inlet valve permits the airflow from the source of airflow to engage with the heat exchanger as at least part of the heat exchanger airflow. The bleed air valve is controllable between closed and open configurations. The bleed air valve is in communication with the compressor section and is configured to receive compressor bleed air. In the open configuration, the bleed air valve allows compressor bleed air to engage with the heat exchanger.

20 Claims, 1 Drawing Sheet

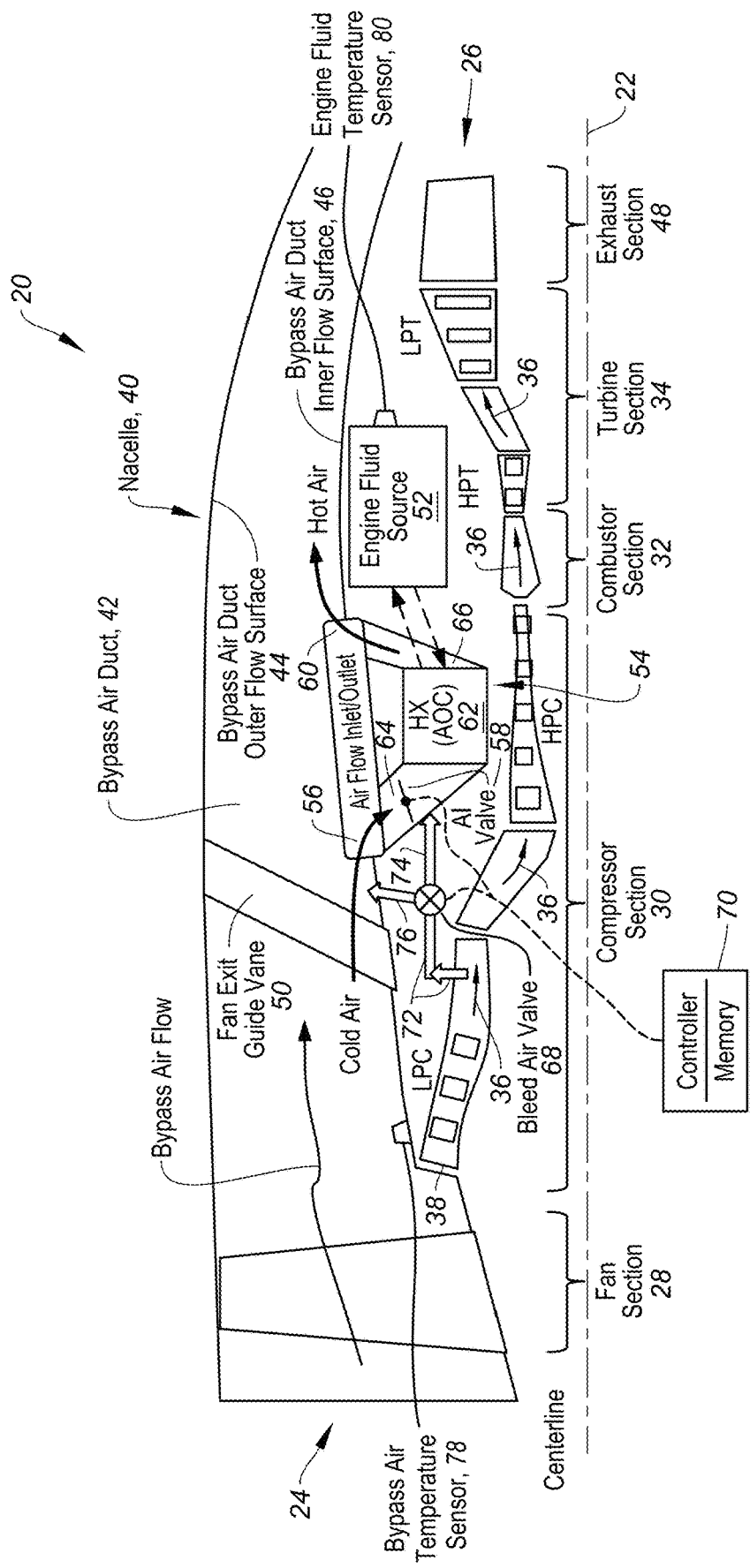

GAS TURBINE ENGINE WITH THERMAL MANAGEMENT

BACKGROUND OF THE INVENTION

1. Technical Field

The present disclosure relates to turbine engines in general, and to air-oil cooling systems utilized within a turbine engine in particular.

2. Background Information

Air-oil heat exchangers may be utilized within a gas turbine engine to cool engine oil or other high temperature fluid that requires cooling. The air is passed through the heat exchanger to cool the oil to an acceptable temperature. Air-oil heat exchangers are typically sized based on the airflow rate and the expected temperature of the air. More specifically, the air-oil heat exchanger is sized to adequately cool the oil under minimum airflow rates and maximum expected air temperature. A heat exchanger sized to adequately cool the oil during on-ground idle (i.e., when airflow rate is at a minimum and air temperature may be at a maximum) may, therefore, be substantially oversized for portions of a flight when airflow rate is at a maximum and air temperature is at a minimum. In many applications, the airflow utilized for cooling purposes is at a "cost"; i.e., the passage of the airflow through the heat exchanger produces aerodynamic losses that reduce the amount of work that can be performed by the airflow. Hence, it would be desirable to have a cooling system that does not require an over-sized heat exchanger, and therefore one that is less likely to produce aerodynamic losses within the airflow.

SUMMARY

According to an aspect of the present disclosure, a fluid thermal control system for a gas turbine engine is provided. The gas turbine engine has a compressor section and an engine fluid source that produces a flow of engine fluid. The fluid thermal control system includes an airflow inlet, an airflow outlet, a heat exchanger, an airflow inlet valve, and a bleed air valve. The airflow inlet is exposed to a source of airflow. The heat exchanger is configured to permit heat transfer between a heat exchanger airflow and the flow of engine fluid. The airflow inlet valve is configured to permit the airflow from the source of airflow to engage with the heat exchanger as at least part of the heat exchanger airflow. The bleed air valve is controllable to be disposed in a closed configuration and an open configuration, wherein the bleed air valve is in communication with the compressor section of the gas turbine engine and is configured to receive compressor bleed air from the compressor section. In the open configuration, the bleed air valve allows compressor bleed air to engage with the heat exchanger as at least part of the heat exchanger airflow. Subsequent to engaging with the heat exchanger, the heat exchanger airflow exits the system through the airflow outlet.

In any of the aspects or embodiments described above and herein, the system may further comprise an inlet passage fluidically connecting the airflow inlet to the heat exchanger and an outlet passage fluidically connecting the heat exchanger to the airflow outlet.

In any of the aspects or embodiments described above and herein, the airflow inlet valve may be disposed within the inlet passage.

In any of the aspects or embodiments described above and herein, the airflow inlet valve may be a controllable valve operable to be disposed in a closed configuration or an open configuration, and in the open configuration the airflow inlet valve allows passage of the airflow toward the heat exchanger.

In any of the aspects or embodiments described above and herein, the bleed air valve open configuration may include first and second open configurations, wherein the first open configuration is a fully open configuration and the second open configuration is a less than fully open configuration.

In any of the aspects or embodiments described above and herein, the system may further include a controller in communication with the airflow inlet valve, the bleed air valve, and a non-transitory memory storing instructions, which instructions when executed cause the controller to control the airflow inlet valve and the bleed air valve.

In any of the aspects or embodiments described above and herein, the airflow inlet valve may be a one-way passive valve disposable in a closed configuration or an open configuration, and in the open configuration the airflow inlet valve allows passage of the airflow toward the heat exchanger. The open configuration may include a first open configuration and a second open configuration, wherein the first open configuration is a fully open configuration and the second open configuration is a less than fully open configuration.

In any of the aspects or embodiments described above and herein, wherein the gas turbine engine may be in communication with a bypass air duct and the airflow inlet may be in fluid communication with the bypass air duct, the source of airflow may be bypass airflow, and the airflow outlet may be in fluid communication with the bypass air duct.

According to an aspect of the present disclosure, a gas turbine engine is provided that includes a compressor section, a combustor section, a turbine section, an engine fluid source that produces a flow of engine fluid, and a fluid thermal control system. The fluid thermal control system includes an airflow inlet, an airflow outlet, a heat exchanger, an airflow inlet valve, and a bleed air valve. The airflow inlet is exposed to a source of airflow. The heat exchanger is configured to permit heat transfer between a heat exchanger airflow and the flow of engine fluid. The airflow inlet valve is configured to permit the airflow from the source of airflow to engage with the heat exchanger as at least part of the heat exchanger airflow. The bleed air valve (BAV) is controllable to be disposed in a BAV closed configuration and a BAV open configuration. The bleed air valve is in communication with the compressor section of the gas turbine engine and is configured to receive compressor bleed air from the compressor section. In the BAV open configuration, the bleed air valve allows compressor bleed air to engage with the heat exchanger as at least part of the heat exchanger airflow. Subsequent to engaging with the heat exchanger, the heat exchanger airflow exits the system through the airflow outlet.

According to an aspect of the present disclosure, a method of cooling an engine fluid utilized within a gas turbine engine is provided. The gas turbine engine includes a compressor section and an engine fluid source that produces a flow of engine fluid. The method includes: operating a bleed air valve to selectively bleed a flow of compressor bleed air off of the compressor section of the gas turbine engine; using an airflow inlet to capture an airflow from an airflow source and directing the airflow to an airflow inlet valve; passing a flow of engine fluid from an engine fluid source through a heat exchanger, wherein the heat exchanger is configured to permit heat transfer between the flow of engine fluid and a heat exchanger airflow; producing the heat exchanger airflow by controlling the bleed air valve to vary the flow of compressor bleed air and controlling the airflow inlet valve to vary the airflow, wherein the heat exchanger airflow is the combination of the compressor bleed air passing through the bleed air valve and the airflow passing through the airflow inlet valve; and passing the heat exchanger airflow through the heat exchanger.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 1 is a diagrammatic partially sectioned view of a gas turbine engine.

DETAILED DESCRIPTION

FIG. 1 shows a diagrammatic partially sectioned view of a gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The compressor section 30 includes a low-pressure compressor (LPC) and a high-pressure compressor (HPC). The turbine section 34 includes a high-pressure turbine (HPT) and a low-pressure turbine (LPT). The engine sections 28, 30, 32, 34 are arranged sequentially along the centerline 22. A core gas path 36 extends through the compressor, combustor, and turbine sections 30, 32, 34. A compressor inlet 38 is disposed aft of the fan section 28. In some embodiments, the fan section 28 and the LPC are connected to and driven by the LPT through a low-speed shaft (not shown), and the HPC is connected to and driven by the HPT through a high-speed shaft (not shown). In some embodiments, the fan section 28 may be connected to a geared architecture (not shown), for example, through a fan shaft (not shown). In these embodiments, the geared architecture and the LPC are driven by the LPT through the low-speed shaft, and the HPC is driven by the HPT through the high-speed shaft.

The terms "forward", "leading", "aft, "trailing" are used herein to indicate the relative position of a component or surface. As core gas air passes through the engine 20, a "leading edge" of a stator vane or rotor blade encounters core gas air before the "trailing edge" of the same. In a conventional axial engine 20 such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path. The gas turbine engine 20 diagrammatically shown is an example provided to facilitate the description herein. The present disclosure is not limited to any particular gas turbine engine configuration.

The gas turbine engine 20 diagrammatically show in FIG. 1 is a bypass gas turbine engine 20 disposed within a nacelle 40. A bypass air duct 42 is disposed within the nacelle 40, radially outside of the engine 20. The bypass air duct 42 may be an annular passage that is defined by a bypass air duct outer flow surface 44 and a bypass air duct inner flow surface 46. The bypass air duct outer flow surface 44 may be formed by a portion of the nacelle 40. The bypass air duct inner flow surface 46 may be formed by a portion of the nacelle 40, or may be formed by structure associated with the engine 20. The present disclosure is not limited to any particular bypass air duct 42 configuration. In the gas turbine engine 20 configuration shown in FIG. 1, the bypass air duct 42 may be described as extending from an axially forward position at the compressor inlet 38 to the exhaust section 48. FIG. 1 also shows fan exit guide vanes 50 extending between the outer and inner bypass air duct flow surfaces 44, 46.

The gas turbine engine 20 embodiment shown in FIG. 1 includes an engine fluid source 52. The engine fluid source 52 may be one or more of the auxiliary systems that provide fluids to or cycle fluids within the gas turbine engine 20. For example, the engine lubrication system that cycles fluid lubricant to and from engine 20 components is an example of an engine fluid source 52. In this example, the engine oil is the engine fluid. As another example, the engine fuel system that provides fuel to the engine combustor section 32 is an example of an engine fluid source 52. In this example, the fuel is the engine fluid. As another example, an engine or aircraft hydraulic system that provides hydraulic fluid to hydraulic components is an example of an engine fluid source 52. In this example, the hydraulic fluid is the engine fluid. As another example, some engines utilize an engine cooling system that utilizes a coolant, in which case the engine cooling system is an example of an engine fluid source 52 and the coolant is the engine fluid.

The gas turbine engine 20 embodiment shown in FIG. 1 includes a present disclosure fluid thermal control system 54 that includes an airflow inlet 56, an airflow inlet valve 58, an airflow outlet 60, a heat exchanger 62, an inlet passage 64 that fluidically connects the airflow inlet 56 to the heat exchanger 62, an outlet passage 66 that fluidically connects the heat exchanger 62 to the airflow outlet 60, and a bleed air valve 68.

In some embodiments, the airflow inlet valve 58 is controllable between a closed configuration, wherein bypass air is prevented from flowing through to the heat exchanger 62, and a plurality of open configurations, wherein some amount of bypass air is passed through to the heat exchanger 62; e.g., an airflow inlet valve 58 fully open position, a second airflow inlet valve 58 open position which is a valve fifty percent (50%) open position, a third open position which is a valve twenty-five percent (25%) open position, and so on. The present disclosure is not limited to any particular number of open positions and/or any particular open percentages, and may be controlled (e.g., using a controller 70 and stored instructions as will be detailed herein) to be disposed in the closed configuration or any open configuration. FIG. 1 diagrammatically illustrates the airflow inlet valve 58 disposed in the inlet passage 64. The present disclosure is not limited to the airflow inlet valve 58 being disposed in the inlet passage 64, or if it is disposed in the inlet passage 64, the present disclosure is not limited to the airflow inlet valve 58 being disposed in any particular position in the inlet passage 64 provided the valve may be operated as described herein; e.g., the airflow inlet valve 58 may be disposed in the inlet passage 64 or in the airflow inlet 56. In those embodiments that have the airflow inlet valve 58 disposed in the inlet passage 64, it is understood that the airflow inlet valve 58 is preferably positioned upstream of where bleed air from the bleed air valve 68 engages with the inlet passage 64, but that is not required. In some embodiments, the airflow inlet valve 58 may be a passive one-way valve configured to operate in a passive mode wherein the degree to which the inlet passage valve 58 is open/closed for flow toward the heat exchanger 62 is dictated by the amount of bypass air passing therethrough. In this embodiment, the airflow inlet valve 58 is configured to prevent airflow in the opposite direction away from the heat exchanger 62; e.g., to prevent compressor bleed air from passing through the airflow inlet valve 58 and into the bypass air duct 42.

The heat exchanger 62 is a two-fluid heat exchanger 62 configured to conduct heat transfer between two fluids; e.g., an elevated temperature engine fluid and a cooling fluid such as bypass air. FIG. 1 diagrammatically illustrates an engine fluid source 52 that is the source of the engine fluid. The elevated temperature engine fluid may be engine oil, hydraulic fluid, engine fuel or the like. The present disclosure provides particular utility for cooling engine oil but is not limited thereto. The heat exchanger 62 may be configured as an annular structure, or the heat exchanger 62 may comprise a plurality of independent heat exchangers 62 that collectively function as described herein, or may be a single non-annular heat exchanger 62. In those instances wherein a plurality of different heat exchangers 62 are utilized, some embodiments of the present disclosure may be configured such that a first engine fluid (e.g., engine oil) is passed through a first heat exchanger 62 and a second engine fluid (e.g., hydraulic fluid, fuel, or the like) may be passed through a second heat exchanger 62. The present disclosure heat exchanger 62 is not limited to any particular heat exchanger 62 configuration other than one that can be used as described herein. To facilitate the description herein, the various heat exchanger 62 configurations possible under the present disclosure will be collectively referred to as "the heat exchanger 62" unless otherwise indicated.

The airflow inlet 56 (sometimes referred to as a "scoop") is configured to capture some amount of bypass airflow that is passing axially forward to aft in the bypass air duct 42. The airflow inlet 56 directs the captured airflow into the inlet passage 64 and the inlet passage 64, in turn, directs the captured airflow into the heat exchanger 62. The airflow outlet 60 is configured to direct bypass airflow that has passed through the heat exchanger 62 and the outlet passage 66 back into the bypass air duct 42. FIG. 1 diagrammatically illustrates the airflow inlet 56 and the airflow outlet 60 in a single block to facilitate the description. The present disclosure is not limited to any particular airflow inlet 56 and airflow outlet 60 configuration. For example, the airflow inlet 56 and the airflow outlet 60 may be disposed in a single structure, or they may be independent structures.

The present disclosure fluid thermal control system 54 further includes a bleed air valve 68 and an airflow inlet valve 58. The bleed air valve 68 is in fluid communication with the compressor section 30 in a manner that selectively allows some amount of core gas bled off of the compressor section 30 to be passed into the heat exchanger inlet passage 64 for subsequent passage into the heat exchanger 62. In the diagrammatic example shown in FIG. 1, the bleed air valve 68 is in fluid communication with the compressor section 30 via a first air conduit 72 and in fluid communication with the heat exchanger inlet passage 64 via a second air conduit 74. The present disclosure fluid thermal control system 54 may further include an optional third conduit 76 that provides fluid communication between the bleed air valve 68 and the bypass air duct 42. The present disclosure fluid thermal control system 54 does not require the optional third conduit 76.

The bleed air valve 68 is controllable between a closed configuration, wherein no compressor bleed air is passed through to the heat exchanger 62, and a plurality of open configurations, wherein some amount of compressor bleed air is passed through to the heat exchanger 62; e.g., a fully open bleed air valve (BAV) position, a second BAV open position which is a valve fifty percent (50%) open position, a third BAV open position which is a valve twenty-five percent (25%) open position, and so on. The present disclosure is not limited to any particular number of bleed air valve 68 open positions and/or any particular bleed air valve 68 open percentage, and may be controlled (e.g., using a controller 70 and stored instructions as will be detailed herein) to be disposed in the closed configuration or any open configuration.

In those present disclosure embodiments that include an optional third conduit 76 that provides fluid communication between the bleed air valve 68 and the bypass air duct 42, the bleed air valve 68 may also be controlled between a closed configuration wherein no air bled off of the compressor is passed through to bypass air duct 42, and a plurality of open configurations wherein some amount of bleed air is passed directly into the bypass air duct 42. In some embodiments, the fluid communication from the compressor to the bypass air duct 42 may be accomplished via a valve (not shown) that is independent of the bleed air valve 68.

The first air conduit 72 that provides fluid communication between the compressor section 30 and the bleed air valve 68 may be engaged with the compressor section 30 in a variety of different positions. Each compressor stage within the compressor section 30 introduces additional work into the core gas flow, increasing the pressure and temperature of the core gas flow. The engagement position between the first air conduit 72 and the compressor section 30 may be chosen to access compressed air at a desirable pressure and temperature for the cooling purposes of the fluid thermal control system 54. Hence, the present disclosure is not limited to bleeding air off of any particular point within the compressor section 30. It is understood, however, that many fluid thermal system applications may be satisfied using air that is bled off of a low pressure compressor (LPC) stage, or at a point in between the low pressure compressor (LPC) and the high pressure compressor (HPC).

FIG. 1 diagrammatically illustrates a present disclosure fluid thermal control system 54 embodiment disposed adjacent the high pressure compressor (HPC) section of engine 20. The present disclosure fluid thermal control system 54 is not limited to any particular position location to the engine 20; e.g., the fluid thermal control system 54 may be disposed adjacent the high pressure compressor (HPC), the combustor section 32, or the turbine section 34 in different applications.

Some embodiments of the present disclosure fluid thermal control system 54 may include, or be in communication with, a controller 70 that is in communication with other fluid thermal control system 54 components, such as the bleed air valve 68 and the airflow inlet valve 58. The controller 70 may also be in communication with one or more controllers associated with the aircraft; e.g., the FADEC. The controller 70 may be in communication with these system components to control and/or receive signals therefrom to perform the functions described herein. The controller 70 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 54 to accomplish the same algorithmically and/or coordination of system components. The system controller 70 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. Communications between the controller and other system components may be via a hardwire connection or via a wireless connection.

During a flight, a gas turbine engine in an aircraft will typically spend some amount of time at ground idle with the aircraft not moving. Subsequently, the aircraft will taxi, takeoff, ascend, cruise, descend, and taxi. A fluid thermal control system 54 must be sized to adequately cool an engine fluid(s) during all of these flight segments.

In a conventional gas turbine engine configuration (i.e., one without the present disclosure fluid thermal control system 54), the heat exchanger is likely sized to provide adequate cooling to the engine fluid under worst case thermal conditions (e.g., when the fluid flow rate of bypass air is low and the ambient air temperature is high, such as may occur during a ground idle) using only bypass air. That same heat exchanger will very likely be significantly oversized for other flight segments (e.g., cruise) where the bypass air flow rate is significantly greater and the ambient air temperature is substantially lower. The oversized heat exchanger typically represents additional weight that negatively affects the fuel efficiency of the aircraft and requires a larger space in an already tight engine compartment. The configuration of a conventional bypass air duct scoop is also typically oversized. The conventional scoop is sized to capture an acceptable amount of bypass airflow during ground idle (when airflow rates are at a minimum), and is oversized during one or more segments of actual flight (e.g., during cruise) when less airflow is required because of substantially lower air temperatures. The larger scoop typically presents larger aerodynamic losses within the bypass duct that negatively affect the efficiency of the engine 20.

The present disclosure fluid thermal control system 54 is understood to provide a substantial improvement over conventional gas turbine engine fluid cooling systems. Importantly, the present disclosure fluid thermal control system 54 is understood to provide the requisite fluid cooling using a heat exchanger 62 that is smaller in size (and therefore lighter) than a heat exchanger within a conventional cooling system used in a similar application. Furthermore, the present disclosure fluid thermal control system 54 is understood to capture an acceptable amount of bypass flow using an airflow inlet 56 that is smaller in size than one used in a conventional cooling system used in a similar application, thereby mitigating bypass air losses attributable to the airflow inlet 56.

During operation of the present disclosure system, the system 54 may utilize only compressor bleed air as the cooling fluid within the heat exchanger 62 during certain flight segments, or only bypass air as the cooling fluid within the heat exchanger 62 during certain flight segments, or a mixture of compressor bleed air and bypass air during certain flight segments. In those instances wherein the system 54 utilizes only compressor bleed air as the cooling fluid within the heat exchanger 62, the system controller 70 may control the airflow inlet valve 58 to be in a closed configuration and control the bleed air valve 68 to be in a fully open configuration. As indicated herein, in some embodiments the airflow inlet valve 58 may be configured as a passive one-way valve wherein the degree to which the inlet passage valve is open/closed (allowing airflow toward the heat exchanger 62) is dictated by the amount of bypass air passing therethrough. Compressor bleed air may be used as the sole cooling fluid within the heat exchanger 62, for example, during ground idle conditions when the bypass air flow rate is low and the ambient temperature is high. The temperature of the compressor bleed air may be somewhat greater than the ambient temperature because of the work input to the core gas within the compressor, but the difference in temperature is not significant. The volume of air available from the compressor bleed air, on the other hand, can be significantly greater than that available from bypass air flow. Hence, the compressor bleed air in these flight segments can alone satisfy the cooling fluid requirements.

In those instances wherein the system 54 utilizes only bypass air as the cooling fluid within the heat exchanger 62, the system controller 70 may control the airflow inlet valve 58 to be in a fully open configuration and control the bleed air valve 68 to be in a closed configuration. Bypass air may be used as the sole cooling fluid within the heat exchanger 62, for example, during flight segments such as cruise when the bypass air flow rate is high and the ambient air temperature is low. Hence, the bypass air in these flight segments alone can satisfy the cooling fluid requirements.

In those instances wherein the system 54 utilizes a mixture of bypass air and compressor bleed air as the cooling fluid within the heat exchanger 62, the system controller 70 may control the airflow inlet valve 58 and the bleed air valve 68 to be disposed in appropriate configurations, and coordinate the operation of the two valves 58, 68. The control of the valves 58, 68 may be based on stored instructions, or on sensor input (e.g., volumetric flow rate data, air temperature data, engine fluid temperature, and the like), or other input, or any combination thereof. For example, if the present disclosure fluid thermal control system 54 is initially controlled to solely use compressor bleed air as the cooling fluid (e.g., during a ground idle segment), during or after takeoff when the bypass airflow rate has significantly increased, the system controller 70 may control the airflow inlet valve 58 to shift from a closed configuration to a partially open configuration, and may control the bleed air valve 68 to shift from a fully open configuration to a partially open configuration. As the aircraft gains altitude and the temperature of the ambient air decreases, the system controller 70 may continue to adjust the settings of the valves 58, 68; e.g., further opening the airflow inlet valve 58 and further closing the bleed air valve 68. As indicated herein, subsequent operating conditions of the engine 20 (e.g., cruise) may permit the system controller 70 to control the airflow inlet valve 58 to a fully open configuration and control the bleed air valve 68 to a closed configuration. As the aircraft subsequently is controlled to descend and eventually land, the system controller 70 can (based on stored instructions, or on sensor input, or other input, or any combination thereof) continuously control and adjust the settings of the airflow inlet valve 58 and the bleed air valve 68 to provide the requisite cooling in an efficient manner. FIG. 1 diagrammatically illustrates a bypass air temperature sensor 78 and an engine fluid temperature sensor 80 as non-limiting examples of sensors that may be used to provide sensor input useful for controlling the valves 58, 68 alone or in combination with stored instructions or other control inputs.

It should be noted that the present disclosure fluid thermal control system 54 is described above in the context of a bypass gas turbine engine 20 wherein bypass air is used (in some instances) as the cooling fluid for the system 54. The present disclosure is not limited to this example and has utility for additional gas turbine engine powerplant configurations. For example, in some instances the present disclosure system 54 may be used in a gas turbine application that does not include a bypass duct and/or a fan case/nacelle. In such an application, ambient air captured outside of a nacelle 40 (i.e., "external air") may be used as the cooling fluid for the system.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A fluid thermal control system for a gas turbine engine, the gas turbine engine having a compressor section and an engine fluid source that produces a flow of engine fluid, the fluid thermal control system comprising:
    an airflow inlet exposed to a source of airflow;
    an airflow outlet;
    a heat exchanger configured to permit heat transfer between a heat exchanger airflow and the flow of engine fluid;
    an airflow inlet valve configured to permit the airflow from the source of airflow to engage with the heat exchanger as at least part of the heat exchanger airflow; and
    a bleed air valve controllable to be disposed in a closed bleed air configuration and an open bleed air configuration, wherein the bleed air valve is in communication with the compressor section of the gas turbine engine and is configured to receive compressor bleed air from the compressor section, wherein in the open bleed air configuration, the bleed air valve allows the compressor bleed air to engage with the heat exchanger as at least part of the heat exchanger airflow, and wherein the bleed air valve is controllable to selectively allow at least part of the compressor bleed air to discharge to the source of airflow upstream of the airflow inlet;
    wherein subsequent to engaging with the heat exchanger, the heat exchanger airflow exits the system through the airflow outlet.

2. The fluid thermal control system of claim 1, further comprising an inlet passage fluidically connecting the airflow inlet to the heat exchanger and an outlet passage fluidically connecting the heat exchanger to the airflow outlet.

3. The fluid thermal control system of claim 2, wherein the airflow inlet valve is disposed within the inlet passage.

4. The fluid thermal control system of claim 3, wherein the airflow inlet valve is a controllable valve operable to be disposed in a closed airflow inlet configuration or an open airflow inlet configuration, and in the open airflow inlet configuration the airflow inlet valve allows passage of the airflow toward the heat exchanger.

5. The fluid thermal control system of claim 4, wherein the open airflow inlet configuration includes a first open airflow inlet configuration and a second open airflow inlet configuration, wherein the first open airflow inlet configuration is a fully open configuration and the second open airflow inlet configuration is a less than fully open configuration.

6. The fluid thermal control system of claim 5, further comprising a controller in communication with the airflow inlet valve, the bleed air valve, and a non-transitory memory storing instructions, which instructions when executed cause the controller to control the airflow inlet valve and the bleed air valve.

7. The fluid thermal control system of claim 3, wherein the airflow inlet valve is a one-way passive valve disposable in a closed airflow inlet configuration or an open airflow inlet configuration, and in the open airflow inlet configuration the airflow inlet valve allows passage of the airflow toward the heat exchanger.

8. The fluid thermal control system of claim 7, wherein the open airflow inlet configuration includes a first open airflow inlet configuration and a second open airflow inlet configuration, wherein the first open airflow inlet configuration is a fully open configuration and the second open airflow inlet configuration is a less than fully open configuration.

9. The fluid thermal control system of claim 1, wherein the gas turbine engine is in communication with a bypass air duct and the airflow inlet is in fluid communication with the bypass air duct, and wherein the source of airflow is bypass airflow.

10. The fluid thermal control system of claim 9, wherein the airflow outlet is in fluid communication with the bypass air duct.

11. A gas turbine engine, comprising:
a compressor section;
a combustor section;
a turbine section;
an engine fluid source that produces a flow of engine fluid; and
a fluid thermal control system that includes:
an airflow inlet exposed to a source of airflow;
an airflow outlet;
a heat exchanger configured to permit heat transfer between a heat exchanger airflow and the flow of engine fluid;
an airflow inlet valve (AIV) configured to permit the airflow from the source of airflow to engage with the heat exchanger as at least part of the heat exchanger airflow; and
a bleed air valve (BAV) controllable to be disposed in a BAV closed configuration and a BAV open configuration, wherein the BAV is in communication with the compressor section of the gas turbine engine and is configured to receive compressor bleed air from the compressor section, wherein in the BAV open configuration, the BAV allows the compressor bleed air to engage with the heat exchanger as at least part of the heat exchanger airflow, and wherein the BAV is controllable to selectively allow at least part of the compressor bleed air to discharge to the source of airflow upstream of the airflow inlet;
wherein subsequent to engaging with the heat exchanger, the heat exchanger airflow exits the system through the airflow outlet.

12. The gas turbine engine of claim 11, further comprising an inlet passage fluidically connecting the airflow inlet to the heat exchanger and an outlet passage fluidically connecting the heat exchanger to the airflow outlet, wherein the AIV is disposed within the inlet passage.

13. The gas turbine engine of claim 12, wherein the AIV is a one-way passive valve disposed to allow passage of the airflow toward the heat exchanger.

14. The gas turbine engine of claim 12, wherein the AIV is a controllable valve operable to be disposed in an AIV closed configuration or an AIV open configuration, and in the AIV open configuration the AIV allows passage of the airflow toward the heat exchanger;
wherein the AIV open configuration includes a first AIV open configuration and a second AIV open configuration, wherein the first AIV open configuration is a fully open configuration and the second AIV open configuration is a less than fully open configuration.

15. The gas turbine engine of claim 14, wherein the BAV open configuration includes a first BAV open configuration and a second BAV open configuration, wherein the first BAV open configuration is a fully open configuration and the second BAV open configuration is a less than fully open configuration.

16. The gas turbine engine of claim 15, further comprising a controller in communication with the AIV, the BAV, and a non-transitory memory storing instructions, which instructions when executed cause the controller to control the AIV and the BAV.

17. The gas turbine engine of claim 11, wherein the gas turbine engine is in communication with a bypass air duct and the airflow inlet is in fluid communication with the bypass air duct, and wherein the source of airflow is bypass airflow, and wherein the airflow outlet is in fluid communication with the bypass air duct.

18. A method of cooling an engine fluid utilized within a gas turbine engine, wherein the gas turbine engine includes a compressor section and an engine fluid source that produces a flow of engine fluid, the method comprising:
operating a bleed air valve (BAV) to selectively bleed a flow of compressor bleed air off of the compressor section of the gas turbine engine;
using an airflow inlet to capture an airflow from an airflow source and directing the airflow to an airflow inlet valve (AIV);
passing the flow of engine fluid from the engine fluid source through a heat exchanger, wherein the heat exchanger is configured to permit heat transfer between the flow of engine fluid and a heat exchanger airflow;
producing the heat exchanger airflow by controlling the BAV to vary the flow of compressor bleed air and controlling the AIV to vary the airflow, wherein the heat exchanger airflow is the combination of the compressor bleed air passing through the BAV and the airflow passing through the AIV; and
passing the heat exchanger airflow through the heat exchanger, wherein, in operating the BAV, the BAV selectively allows at least part of the compressor bleed air to discharge to the airflow source upstream of the airflow inlet.

19. The method of claim 18, wherein the AIV is controllable to be disposed in an AIV closed configuration or an AIV open configuration, and in the AIV open configuration the AIV allows passage of the airflow toward the heat exchanger, and wherein the AIV open configuration includes a first AIV open configuration and a second AIV open configuration, wherein the first AIV open configuration is a fully open configuration and the second AIV open configuration is a less than fully open configuration.

20. The method of claim 19, wherein the BAV is controllable to be disposed in a BAV closed configuration and a BAV open configuration, and wherein the BAV open configuration includes a first BAV open configuration and a second BAV open configuration, and wherein the first BAV open configuration is a fully open configuration and the second BAV open configuration is a less than fully open configuration.

* * * * *